United States Patent
Chen et al.

(10) Patent No.: US 11,265,708 B2
(45) Date of Patent: Mar. 1, 2022

(54) METHOD AND DEVICE FOR JOINING ACCESS NODE GROUP

(71) Applicant: China Academy of Telecommunications Technology, Beijing (CN)

(72) Inventors: Shanzhi Chen, Beijing (CN); Zhonglin Chen, Beijing (CN); Ming Ai, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 179 days.

(21) Appl. No.: 16/472,208

(22) PCT Filed: Oct. 20, 2017

(86) PCT No.: PCT/CN2017/107136
§ 371 (c)(1),
(2) Date: Jun. 21, 2019

(87) PCT Pub. No.: WO2018/113402
PCT Pub. Date: Jun. 28, 2018

(65) Prior Publication Data
US 2019/0334893 A1    Oct. 31, 2019

(30) Foreign Application Priority Data
Dec. 21, 2016 (CN) .......................... 201611193310.5

(51) Int. Cl.
*H04L 29/06* (2006.01)
*H04W 12/06* (2021.01)
*H04L 9/32* (2006.01)
*H04W 12/08* (2021.01)
*H04W 12/069* (2021.01)

(52) U.S. Cl.
CPC ........... *H04W 12/06* (2013.01); *H04L 9/3213* (2013.01); *H04L 63/0869* (2013.01);
(Continued)

(58) Field of Classification Search
None
See application file for complete search history.

(56) References Cited

U.S. PATENT DOCUMENTS

| | | | | |
|---|---|---|---|---|
| 2001/0001089 A1* | 5/2001 | Krishnamurthi | ...... | H04W 28/18 455/414.1 |
| 2001/0027101 A1* | 10/2001 | Koyama | ............. | H04W 12/062 455/433 |

(Continued)

FOREIGN PATENT DOCUMENTS

| | | |
|---|---|---|
| CN | 101511084 A | 8/2009 |
| CN | 102612078 A | 7/2012 |
| CN | 102625308 A | 8/2012 |
| CN | 105451250 A | 3/2016 |

OTHER PUBLICATIONS

Zhonglin Chen et al: "Security architecture and scheme of user-centric ultra-dense network (UUDN)", Transactions on Emerging Telecommunications Technologies, vol. 28, No. 9, Sep. 1, 2017 (Sep. 1, 2017), p. e3149, XP055635375, GB ISSN: 2161-3915, DOI: 10.1002/ett.3149.

(Continued)

*Primary Examiner* — William J. Goodchild
(74) *Attorney, Agent, or Firm* — Kilpatrick Townsend & Stockton, LLP

(57) ABSTRACT

Embodiments of the present invention relate to the technical field of wireless communications, especially a method and device for joining an access node group (APG), for use in resolving the problem in the prior art of an access node being unable to join an APG securely. In the embodiments of the present invention, the access node performs network layer two-way authentication with a local service center after determining to join the APG; and the access node performs network configuration according to configuration information in a network configuration message after receiving the network configuration message sent by the local service (Continued)

center. Therefore, an APG corresponding to a user equipment follows the user equipment, and at the same time, it can be ensured that an access node may join the APG securely.

17 Claims, 6 Drawing Sheets

(52) U.S. Cl.
CPC ......... *H04L 63/104* (2013.01); *H04W 12/069* (2021.01); *H04W 12/08* (2013.01)

(56) References Cited

U.S. PATENT DOCUMENTS

| | | | |
|---|---|---|---|
| 2004/0249977 A1* | 12/2004 | Minamisawa | .......... H04L 67/24 |
| | | | 709/245 |
| 2015/0113277 A1 | 4/2015 | Harkins | |
| 2016/0198521 A1* | 7/2016 | Miller | ................... H04W 84/18 |
| | | | 370/329 |
| 2016/0309328 A1 | 10/2016 | Zhang et al. | |

OTHER PUBLICATIONS

Chen Shanzhi et al: "User-centric ultra-dense networks for 5G: challenges, methodologies, and directions", IEEE Wireless Communications, vol. 23, No. 2, Apr. 1, 2016 (Apr. 1, 2016), pp. 78-85, XP011607851, ISSN: 1536-1284, DOI: 10.1109/MWC.2016.7462488.

* cited by examiner

METHOD AND DEVICE FOR JOINING ACCESS NODE GROUP

This application is a US National Stage of International Application No. PCT/CN2017/107136, filed on Oct. 20, 2017, which claims priority to Chinese Patent Application No. 201611193310.5, filed on Dec. 21, 2016, both of which are hereby incorporated by reference in their entireties.

FIELD

The present invention relates to the field of wireless communications, and particularly to a method and device for joining an access points group.

BACKGROUND

In the future network, a traditional macro base station with high power, and a large number of deployed base stations with low power constitute an Ultra-Dense Network (UDN), and this is a very promising option for satisfying the demand for a data rate of future wireless mobile communication.

In an UDN scenario, the density of a huge number of Access Points (APs) may even be equivalent to that of their users. In order to further improve a user experience, a User-centric Ultra-Dense Network (UUDN) solution has been proposed. In an UUDN scenario, a dynamically varying Access Points Group (APG) will be organized to serve moving users without being perceived, that is, there will be one AGP corresponding to each user equipment in the UDN or UUDN scenario.

In the existing network, respective Network Entities (NEs) are deployed as planned by an operator, and relatively fixed in position, and once they are deployed, APs are very unlikely to quit an APG or access another APG However in the UDN or UUDN scenario, physical security environments of access networks are complicated, and very different from each other, so there will be a diversity of access modes of the APs in future, and even an access mode may be deployed by a user; and the huge number of APs are more proximate to the user side than the traditional macro base station, and each user equipment corresponds to a dynamically varying APG. As a user equipment is moving, an APG member corresponding to the user equipment may vary constantly. Since the APG member serving the user equipment is dynamic, and an AP may belong to a plurality of APGs, in order to avoid an illegal AP pretending to an AP in a legal APG from attacking, it is highly desirable to enable an AP to securely join an APG providing a user equipment with a corresponding service in the UDN or UUDN scenario.

In summary, there has been absent so far a method for joining an AP to an APG in the UDN or UUDN scenario.

SUMMARY

Embodiments of the invention provide a method and device for joining an access points group so as to address the problem in the prior art that an access point cannot securely join an Access Points Group (APG) in an UDN or UUDN scenario.

In a first aspect, an embodiment of the invention provides a method for joining an access points group, the method including:

performing, by an access point, network-layer mutual authentication with a local service center upon determining that the access point is going to join an access points group; and performing, by the access point, network configuration according to configuration information in a network configuration message sent by the local service center, upon reception of the network configuration message; wherein the network configuration message is sent by the local service center upon determining that network-layer mutual authentication is passed.

Optionally, performing, by the access point, network-layer mutual authentication with the local service center includes:

authenticating, by the access point, a network side according to an access points group identifier corresponding to the access points group, and a network-layer authentication parameter, which are sent by the local service center; and returning, by the access point, a network-layer authentication response message including the access points group identifier to the local service center after authentication on the network side is passed, so that the local service center authenticates the access point according to the network-layer authentication response message.

Optionally, authenticating, by the access point, the network side according to the access points group identifier corresponding to the access points group, and the network-layer authentication parameter, which are sent by the local service center includes:

determining, by the access point, a second authentication token according to a random number in the network-layer authentication parameter; and determining, by the access point, that authentication on the network side is passed if the second authentication token is the same as a first authentication token in the network-layer authentication parameter.

Optionally, returning, by the access point, the network-layer authentication response message including the access points group identifier to the local service center after authentication is passed includes:

determining, by the access point, an authentication response parameter according to a random number in the network-layer authentication parameter, after authentication on the network side is passed; and returning, by the access point, the network-layer authentication response message including the access points group identifier and the authentication response parameter to the local service center, so that the local service center authenticates the access point according to the access points group identifier and the authentication response parameter.

Optionally, determining, by the access point, that the access point is going to join the access points group includes:

determining, by the access point, that the access point is going to join the access points group, upon satisfying a joining condition;

wherein the joining condition includes a part or all of:
a new user equipment in a coverage area is detected; or
an access instruction message sent by the local service center is received.

Optionally, the joining condition includes a new user equipment in a coverage area is detected; and after the access point determines that the access point is going to join the access points group, and before the access point performs network-layer mutual authentication with the local service center, the method further includes:

sending, by the access point, a joining request message to the local service center so that the local service center obtains a network-layer authentication parameter corresponding to the access point from a network service center according to the joining request message; and receiving, by the access point, a network-layer authentication request message including an access points group identifier corresponding to the access points group, and the network-layer authentication parameter.

Optionally, the access instruction message includes an access points group identifier corresponding to the access points group, and a network-layer authentication parameter, wherein the network-layer authentication parameter is obtained by the local service center from a network service center.

Optionally, the method further includes:

reporting, by the access point, to the local service center a quit from the access points group upon determining that the access point is going to quit the access points group; and determining, by the access point, that the access point is going to quit an access points group corresponding to a user equipment includes:

determining, by the access point, that the access point is going to quit the access points group, when no target user equipment is detected in a coverage area, wherein the target user equipment is a user equipment which previously is able to be detected in the coverage area of the access point; and/or determining, by the access point, that the access point is going to quit the access points group, when the access point is going to be powered off.

Optionally, after the access point performs network-layer mutual authentication with the local service center, the method further includes:

receiving, by the access point, a first key and a second key sent by the local service center; and determining, by the access point, a communication key for encrypted communication with the user equipment according to the first key, and determining a communication key for encrypted communication with another access point in the access points group according to the second key.

In a second aspect, an embodiment of the invention provides a method for joining an access points group, the method including:

performing, by a local service center, network-layer mutual authentication with an access point upon determining that the access point is going to join an access points group; and sending, by the local service center, a network configuration message to the access point upon determining that network-layer mutual authentication is passed, so that the access point is configured according to configuration information in the network configuration message.

Optionally, performing, by the local service center, network-layer mutual authentication with the access point includes:

performing, by the local service center, network-layer mutual authentication with the access point according to an access points group identifier corresponding to the access points group, and a network-layer authentication parameter;

wherein the network-layer authentication parameter is obtained by the local service center from a network service center.

Optionally, performing, by the local service center, network-layer mutual authentication with the access point according to the access points group identifier corresponding to the access points group, and the network-layer authentication parameter includes:

sending, by the local service center, the access points group identifier corresponding to the access points group, and the network-layer authentication parameter to the access point so that the access point authenticates a network side according to the access points group identifier and the network-layer authentication parameter; and authenticating, by the local service center, the access point according to a network-layer authentication response message including the access points group identifier, returned by the access point, upon determining that the network-layer authentication response message is received by the local service center.

Optionally, authenticating, by the local service center, the access point according to the network-layer authentication response message includes:

determining, by the local service center, that authentication on the access point is passed, if an authentication response parameter in the network-layer authentication response message is the same as an expected response parameter in the network-layer authentication parameter.

Optionally, determining, by the local service center, that the access point is going to join the access points group includes:

determining, by the local service center, that the access point is going to join the access points group, upon reception of a joining request message sent by the access point; and/or determining, by the local service center, that the access point is going to join the access points group, according to scheduling information.

Optionally, if the local service center determines that the access point is going to join the access points group, upon reception of the joining request message sent by the access point, then the local service center sends a network-layer authentication request message including the access points group identifier corresponding to the access points group, and the network-layer authentication parameter to the access point so that the access point authenticates the network side according to the network-layer authentication request message; and if the local service center determines that the access point is going to join the access points group, according to the scheduling information, then the local service center sends an access instruction message including the access points group identifier corresponding to the access points group, and the network-layer authentication parameter to the access point so that the access point authenticates the network side according to the access instruction message.

Optionally, the network-layer authentication parameter includes a temporary key; and after the local service center determines that network-layer mutual authentication is passed, the method further includes:

determining, by the local service center, a first key and a second key corresponding to the access point according to the temporary key, and sending the first key and the second key to the access point, so that the access point determines a communication key for encrypted communication with a user equipment according to the first key, and determines a communication key for encrypted communication with another access point in the access points group according to the second key.

Optionally, determining, by the local service center, the first key and the second key corresponding to the access point, relative to another access point in the access points group, according to the temporary key includes:

determining, by the local service center, an intermediate key corresponding to the access points group according to the temporary key and the access points group identifier; and determining, by the local service center, the first key and the second key corresponding to the access point according to the intermediate key and the access points group identifier.

Optionally, after the local service center sends the network configuration message to the access point, the method further includes:

determining, by the local service center, that the access point has quitted an access points group corresponding to a user equipment, and deleting the temporary key, the intermediate key, the first key and the second key, upon reception of a report of the access point that the access point has quitted the access points group corresponding to the user equipment.

In a third aspect, an embodiment of the invention provides an access point including:

a first authentication module configured to perform network-layer mutual authentication with a local service center upon determining that the access point is going to join an access points group; and a configuration module configured to perform network configuration, upon reception of a network configuration message sent by the local service center, according to configuration information in the network configuration message, wherein the network configuration message is sent by the local service center upon determining that network-layer mutual authentication is passed.

Optionally, the first authentication module is configured to:

authenticate a network side according to an access points group identifier corresponding to the access points group, and a network-layer authentication parameter, which are sent by the local service center; and return a network-layer authentication response message including the access points group identifier to the local service center after authentication on the network side is passed, so that the local service center authenticates the access point according to the network-layer authentication response message.

Optionally, the first authentication module is configured to:

determine a second authentication token according to a random number in the network-layer authentication parameter, and determine that authentication on the network side is passed if the second authentication token is the same as a first authentication token in the network-layer authentication parameter.

Optionally, the first authentication module is configured to:

determine an authentication response parameter according to a random number in the network-layer authentication parameter, after authentication on the network side is passed, and return the network-layer authentication response message including the access points group identifier and the authentication response parameter to the local service center, so that the local service center authenticates the access point according to the access points group identifier and the authentication response parameter.

Optionally, the first authentication module is configured to:

determine that the access point is going to join the access points group, upon satisfying a joining condition;

wherein the joining condition includes a part or all of:

a new user equipment in a coverage area is detected; or an access instruction message sent by the local service center is received.

Optionally, the joining condition includes a new user equipment in a coverage area is detected; and the first authentication module is further configured to:

send a joining request message to the local service center so that the local service center obtains a network-layer authentication parameter corresponding to the access point from a network service center according to the joining request message, after it is determined that the access point is going to join the access points group, and before network-layer mutual authentication is performed with the local service center; and receive a network-layer authentication request message including an access points group identifier corresponding to the access points group, and the network-layer authentication parameter.

Optionally, the access instruction message includes an access points group identifier corresponding to the access points group, and a network-layer authentication parameter, wherein the network-layer authentication parameter is obtained by the local service center from a network service center.

Optionally, the first authentication module is further configured to:

report to the local service center a quit from an access points group upon determining that the access point is going to quit the access points group; and the first authentication module is configured to:

determine that the access point is going to quit the access points group, when no target user equipment is detected in a coverage area, wherein the target user equipment is a user equipment which previously is able to be detected in the coverage area of the access point; and/or determine that the access point is going to quit the access points group, when the access point is going to be powered off.

Optionally, the first authentication module is further configured to:

receive a first key and a second key sent by the local service center, after network-layer mutual authentication is performed with the local service center; determine a communication key for encrypted communication with the user equipment according to the first key, and determine a communication key for encrypted communication with another access point in the access points group according to the second key.

In a fourth aspect, an embodiment of the invention provides a local service center including:

a second authentication module configured to perform network-layer mutual authentication with an access point upon determining that the access point is going to join an access points group; and a sending module configured to send a network configuration message to the access point upon determining that network-layer mutual authentication is passed, so that the access point is configured according to configuration information in the network configuration message.

Optionally, the second authentication module is configured to:

perform network-layer mutual authentication with the access point according to an access points group identifier corresponding to the access points group, and a network-layer authentication parameter, wherein the network-layer authentication parameter is obtained by the local service center from a network service center.

Optionally, the second authentication module is configured to:

send the access points group identifier corresponding to the access points group, and the network-layer authentication parameter to the access point so that the access point authenticates a network side according to the access points group identifier and the network-layer authentication parameter, and if a network-layer authentication response message including the access points group identifier, returned by the access point is received, authenticate the access point according to the network-layer authentication response message.

Optionally, the second authentication module is configured to:

determine that authentication on the access point is passed, if an authentication response parameter in the network-layer authentication response message is the same as an expected response parameter in the network-layer authentication parameter.

Optionally, the second authentication module is configured to:

determine that the access point is going to join the access points group, upon reception of a joining request message sent by the access point; and/or determine that the access point is going to join the access points group, according to scheduling information.

Optionally, the second authentication module is configured to:

send a network-layer authentication request message including the access points group identifier corresponding to the access points group, and the network-layer authentication parameter to the access point so that the access point authenticates the network side according to the network-layer authentication request message, if it is determined, upon reception of the joining request message sent by the access point, that the access point is going to join the access points group; and send an access instruction message including the access points group identifier corresponding to the access points group, and the network-layer authentication parameter to the access point so that the access point authenticates the network side according to the access instruction message, if it is determined, according to the scheduling information, that the access point is going to join the access points group.

Optionally, the network-layer authentication parameter includes a temporary key; and the second authentication module is further configured to:

determine a first key and a second key corresponding to the access point according to the temporary key, after it is determined that network-layer mutual authentication is passed; and send the first key and the second key to the access point, so that the access point determines a communication key for encrypted communication with a user equipment according to the first key, and determines a communication key for encrypted communication with another access point in the access points group according to the second key.

Optionally, the second authentication module is further configured to:

determine an intermediate key corresponding to the access points group according to the temporary key and the access points group identifier, and determine the first key and the second key corresponding to the access point according to the intermediate key and the access points group identifier.

Optionally, the sending module is further configured to:

determine, upon reception of a report of the access point that the access point has quitted an access points group corresponding to a user equipment, that the access point has quitted the access points group corresponding to the user equipment, and delete the temporary key, the intermediate key, the first key and the second key, after the network configuration message is sent to the access point.

In the embodiments of the invention, when an access point is going to join an access points group, the access point needs to perform network-layer mutual authentication with a local service center, and the access point can access the corresponding access points group after network-layer mutual authentication is passed, so that an access point can securely join an access points group corresponding to a user equipment while the access points group is varying with the moving user equipment.

DETAILED DESCRIPTION OF THE EMBODIMENTS

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Firstly, an implementation environment of the technical solutions according to the embodiments of the invention will be described.

Figure 1:
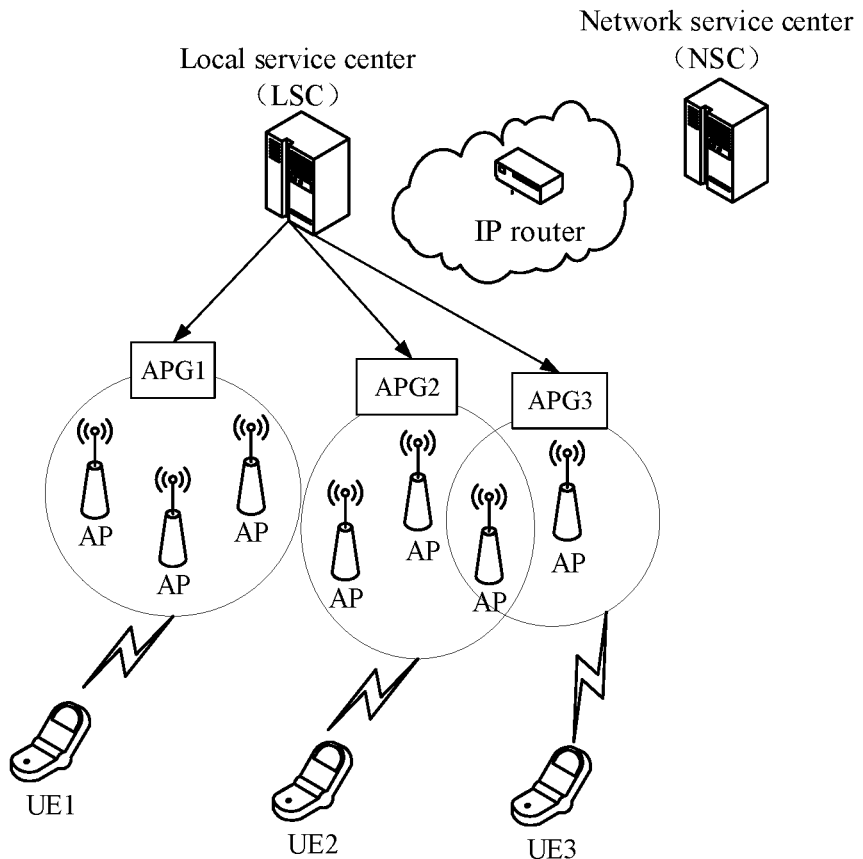
FIG. 1 is a schematic structural diagram of an ultra-dense network according to an embodiment of the invention.

FIG. 1 is a schematic structural diagram of an ultra-dense network, and as illustrated, the structure of the network generally includes: a Network Service Center (NSC), a Local Service Center (LSC), a plurality of User Equipment (UE), and a plurality of APGs serving the plurality of UE;

where each APG includes a plurality of APs, and a same AP may belong to different APGs; and each APG corresponds to an access points group identifier ID, and each APG corresponds to one UE. The APs in respective APGs are wirelessly connected with the plurality of UE, the respective APs are wired with the LSC, and the LSC is connected with the NSC over an IP network.

In the following description, firstly an implementation in which a network side and a user equipment side operate in cooperation with each other will be described, and then respective implementations in which the network side and the user equipment side operate separately from each other will be described respectively, but this shall not suggest that they should operate in cooperation with each other in an implementation; and in fact, respective problems at the network side and the user equipment side can also be addressed when they operate separately from each other in the respective implementations, although a better technical effect can be achieved when both of them operate in cooperation with each other in an implementation.

Figure 2:
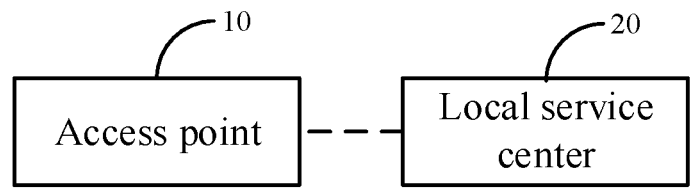
FIG. 2 is a schematic structural diagram of a system for joining an access points group according to an embodiment of the invention.

As illustrated in FIG. 2, a system for joining an access points group according to an embodiment of the invention includes an access point 10 and a local service center 20.

The access point 10 is configured to perform network-layer mutual authentication with the local service center upon determining that the access point is going to join an access points group; and to perform network configuration, upon reception of a network configuration message sent by the local service center, according to configuration information in the network configuration message, where the network configuration message is sent by the local service center upon determining that the network-layer mutual authentication is passed.

The local service center 20 is configured to perform the network-layer mutual authentication with the access point upon determining that the access point is going to join the access points group; and to send the network configuration message to the access point upon determining that the network-layer mutual authentication is passed, so that the access point is configured according to the configuration information in the network configuration message.

In the embodiment of the invention, when an access point is going to join an access points group, the access point needs to perform network-layer mutual authentication with a local service center, and the access point can access a corresponding access points group after network-layer mutual authentication is passed, so that an access point can securely join an access points group corresponding to a user equipment while the access points group is varying with the moving user equipment.

There are two aspects in the embodiment of the invention: an access point joins an access points group, and an access point quits an access points group, which will be described below respectively.

I. An access point joins an access points group.

The access point determines that the access point is going to join the access points group, upon satisfying a joining condition.

Where the joining condition includes a part or all of: a new user equipment in a coverage area is detected; and an access instruction message sent by the local service center is received.

The following instances will be described under the respective joining conditions.

In a first instance, the joining condition is that a new user equipment in a coverage area is detected.

The access point periodically detects user equipment in the coverage area thereof, and obtains user information of the user equipment.

The access point sends a joining request message to the local service center upon determining that a new user equipment is detected; and the local service center determines that the access point is going to join the access points group, upon reception of the joining request message sent by the access point.

Here the joining request message sent by the access point to the local service center includes identification information of the new user equipment so that the local service center determines the access points group to be joined by the access point, according to a binding relationship between identification information and an access points group.

Optionally, the access point sends the joining request message to the local service center so that the local service center obtains a network-layer authentication parameter corresponding to the access point from the network service center according to the joining request message.

Particularly, the local service center sends an authentication parameter request message to the network service center, where the authentication parameter request message includes the identification information of the new user equipment detected by the access point; and the network service center receives the authentication parameter request message sent by the local service center, and generates a network-layer authentication parameter corresponding to the user equipment, i.e., the network-layer authentication parameter corresponding to the access point, according to the identification information of the user equipment in the authentication parameter request message.

The network-layer authentication parameter includes a random number (RAND), an expected response parameter (XRES), an authentication token (AUTN), and a temporary key ($K_{LSC}$); where $K_{LSC}$ is determined according to a root key k corresponding to the user equipment stored in the network service center, and RAND in the network-layer authentication parameter; and $K_{LSC}$ is used by the local service center to derive a communication key for communication between the access point and the user equipment, and a communication key for communication between the access point and another access point in the access points group.

The network service center sends the generated network-layer authentication parameter corresponding to the access point to the local service center, and the local service center locally stores the received network-layer authentication parameter corresponding to the access point.

Network-layer mutual authentication between the access point and the local service center will be described below in details.

The local service center sends a network-layer authentication request message including the access points group identifier corresponding to the access points group, and the network-layer authentication parameter to the access point.

Here the network-layer authentication request message includes an access points group identifier APG_ID, and the network-layer authentication parameter includes RAND and AUTN.

The access points group identifier APG_ID can be added to the network-layer authentication request message as a separate parameter; or the access points group identifier APG_ID can be XORed with some parameter in the network-layer authentication parameter to be added in a hidden way to the network-layer authentication request message, and for example, APG_ID and AUTN can be XORed.

Correspondingly, if the access points group identifier APG_ID, and some parameter in the network-layer authentication parameter are XORed and added in a hidden way to the network-layer authentication request message to be sent, then the access point will parse the network-layer authentication parameter for the access points group identifier APG_ID upon reception of the network-layer authentication request message.

The local service center performs network-layer mutual authentication with the access point according to the access points group identifier corresponding to the access points group, and the network-layer authentication parameter.

Here the network-layer mutual authentication between the local service center and the access point includes: network-side authentication of the access point on the local service center, and authentication of the local service center on the access point.

1. The access point performs network-side authentication on the local service center.

The access point authenticates the network side according to the access points group identifier corresponding to the access points group, and the network-layer authentication parameter, which are sent by the local service center.

Particularly, the access point determines a second authentication token according to the random number in the network-layer authentication parameter, and if the second authentication token is the same as the first authentication token in the network-layer authentication parameter, then the access point will determine that authentication on the network side is passed.

Stated otherwise, the access point determines AUTN according to RAND in the network-layer authentication request message, and if the AUTN determined by the access point is the same as AUTN in the network-layer authentication request message, then the access point will determine that authentication on the network side is passed.

The access point returns a network-layer authentication response message including the access points group identifier to the local service center after authentication is passed, so that the local service center authenticates the access point according to the network-layer authentication response message.

Particularly, the access point determines an authentication response parameter according to the random number in the network-layer authentication parameter after authentication is passed, and the access point returns the network-layer authentication response message including the access points group identifier and the authentication response parameter to the local service center, so that local service center authenticates the access point according to the access points group identifier and the authentication response parameter.

Stated otherwise, the access point determines the authentication response parameter (RES) according to RAND in the network-layer authentication parameter after authentication on the network side is passed, and returns the network-layer authentication response message including APG_ID and RES to the local service center.

The access points group identifier APG_ID can be added to the network-layer authentication response message as a separate parameter, or the access points group identifier APG_ID can be XORed with the authentication response parameter to be added in a hidden way to the network-layer authentication response message, and for example, APG_ID and RES can be XORed.

Correspondingly, if the access points group identifier APG_ID and the authentication response parameter are XORed and added in a hidden way to the network-layer authentication response message to be sent, then the local service center will parse the authentication response parameter for the access points group identifier APG_ID upon reception of the network-layer authentication response message.

2. The local service center authenticates the access point.

The local service center receives the network-layer authentication response message including the access points group identifier returned by the access point, and then authenticates the access point according to the network-layer authentication response message.

If the authentication response parameter in the network-layer authentication response message is the same as the expected response parameter in the network-layer authentication parameter, then the local service center will determine that authentication on the access point is passed.

Particularly, the local service center determines whether RES in the network-layer authentication response message is the same as XRES in the network-layer authentication parameter, and if so, then it will determine that authentication on the access point is passed.

Figure 3:
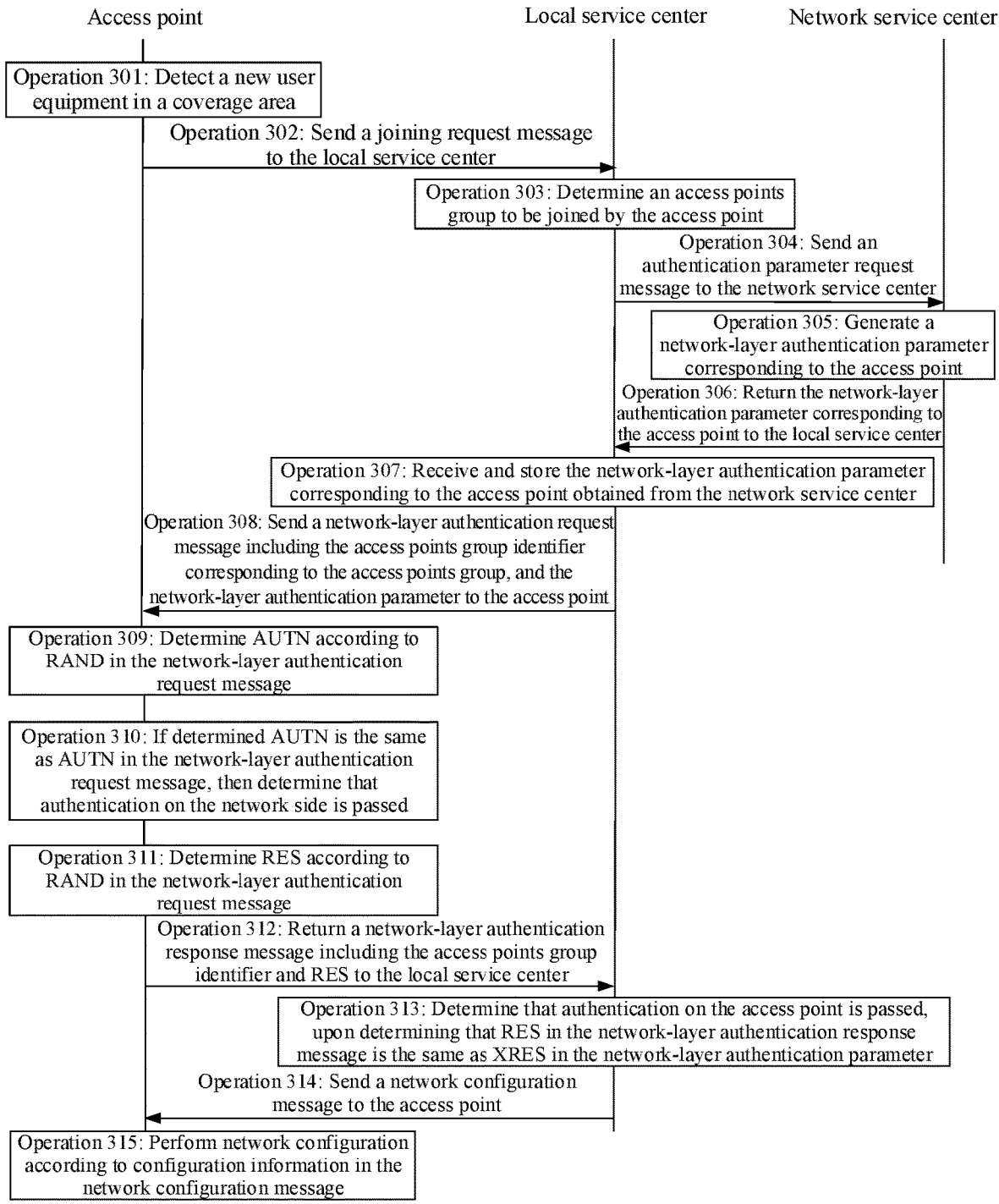
FIG. 3 is a first general flow chart of a method for joining an access points group according to an embodiment of the invention.

FIG. 3 illustrates a flow chart of a method for joining an access points group according to an embodiment of the invention.

In the operation 301, an access point detects a new user equipment in a coverage area.

In the operation 302, the access point sends a joining request message to a local service center.

Here the joining request message includes identification information of the detected new user equipment.

In the operation 303, the local service center determines an access points group to be joined by the access point.

In the operation 304, the local service center sends an authentication parameter request message to a network service center.

Here the authentication parameter request message includes the identification information of the new user equipment detected by the access point.

In the operation 305, the network service center generates a network-layer authentication parameter corresponding to the access point according to the identification information of the user equipment in the authentication parameter request message.

In the operation 306, the network service center returns the network-layer authentication parameter corresponding to the access point to the local service center.

In the operation 307, the local service center receives and stores the network-layer authentication parameter corresponding to the access point obtained from the network service center.

In the operation 308, the local service center sends a network-layer authentication request message including the access points group identifier corresponding to the access points group, and the network-layer authentication parameter to the access point.

In the operation 309, the access point determines AUTN according to RAND in the network-layer authentication request message.

In the operation 310, if determined AUTN is the same as AUTN in the network-layer authentication request message, then the access point will determine that authentication on the network side is passed.

In the operation 311, the access point determines RES according to RAND in the network-layer authentication request message.

In the operation 312, the access point returns a network-layer authentication response message including the access points group identifier and RES to the local service center.

In the operation 313, the local service center determines that authentication on the access point is passed, upon determining that RES in the network-layer authentication response message is the same as XRES in the network-layer authentication parameter.

In the operation 314, the local service center sends a network configuration message to the access point.

In the operation 315, the access point performs network configuration according to configuration information in the network configuration message.

In a second instance, the joining condition is that the access point receives an access instruction message sent by the local service center.

The local service center determines that the access point is going to join an access points group, according to scheduling information.

Here the scheduling information includes an identifier APG_ID of the access points group to be joined by the access point.

Furthermore, the secluding information is notified by an operator to the local service center as needed in reality to instruct the local service center to join the access point to the specified access points group.

For example, the operator determines that a user equipment A needs to communicate concurrently with a large number of other user equipment, and in order to enable the user equipment A to communicate normally, there are a large number of access points in an AGP corresponding to the user equipment A to provide the user equipment A with a communication service. For example, the AGP corresponding to the user equipment A includes AP1, AP2, AP3, and AP4, and the operator sends scheduling information to the local service center to instruct the local service center to joint AP5 and AP6 to the AGP corresponding to the user equipment A.

Before the access point joins the access points group, the access point is going to perform network-layer mutual authentication with the local service center.

Before the access point performs network-layer mutual authentication with the local service center, the local service center sends an access instruction message including an access points group identifier corresponding to the access points group, and a network-layer authentication parameter to the access points group, so that the access point authenticates the network side according to the access instruction message.

Here the network-layer authentication parameter is obtained by the local service center from the network service center.

The local service center obtains the network-layer authentication parameter from the network service center as follows.

Particularly, the local service center determines identification information of a user equipment bound with the access points group according to a binding relationship between a user equipment and an access points group, upon determining the access points group to be joined by the access point, according to the scheduling information.

The local service center sends an authentication parameter request message to the network service center, where the authentication parameter request message includes the identification information of the new user equipment detected by the access point.

The network service center receives the authentication parameter request message sent by the local service center, and generates the network-layer authentication parameter corresponding to the user equipment, i.e., a network-layer authentication parameter corresponding to the access point, according to the identification information of the user equipment in the authentication parameter request message.

The network-layer authentication parameter includes a random number (RAND), an expected response parameter (XRES), an authentication token (AUTN), and a temporary key ($K_{LSC}$); where $K_{LSC}$ is determined according to a root key k corresponding to the user equipment stored in the network service center, and RAND in the network-layer authentication parameter; and $K_{LSC}$ is used by the local service center to derive a communication key for communication between the access point and the user equipment, and a communication key for communication between the access point and another access point in the access points group.

The network service center sends the generated network-layer authentication parameter corresponding to the access point to the local service center, and the local service center locally stores the received network-layer authentication parameter corresponding to the access point.

Network-layer mutual authentication between the access point and the local service center will be described below in details.

The local service center sends an access instruction message including the access points group identifier corresponding to the access points group, and the network-layer authentication parameter to the access points group.

Here the access instruction message includes the access points group identifier APG_ID, and the network-layer authentication parameter includes RAND and AUTN.

The access points group identifier APG_ID can be added to the access instruction message as a separate parameter; or the access points group identifier APG_ID can be XORed with some parameter in the network-layer authentication parameter to be added in a hidden way to the access instruction message, and for example, APG_ID and AUTN can be XORed.

Correspondingly, if the access points group identifier APG_ID, and some parameter in the network-layer authentication parameter are XORed and added in a hidden way to the access instruction message to be sent, then the access point will parse the network-layer authentication parameter for the access points group identifier APG_ID upon reception of the access instruction message.

The local service center performs network-layer mutual authentication with the access point according to the access points group identifier corresponding to the access points group, and the network-layer authentication parameter.

Here network-layer mutual authentication between the local service center and the access point includes: network-side authentication of the access point on the local service center, and authentication of the local service center on the access point.

1. The access point performs network-side authentication on the local service center.

The access point authenticates the network side according to the access points group identifier corresponding to the access points group, and the network-layer authentication parameter, which are sent by the local service center.

Particularly, the access point determines a second authentication token according to the random number in the network-layer authentication parameter, and if the second authentication token is the same as the first authentication token in the network-layer authentication parameter, then the access point will determine that authentication on the network side is passed.

Stated otherwise, the access point determines AUTN according to RAND in the network-layer authentication request message, and if AUTN determined by the access point is the same as AUTN in the network-layer authentication request message, then the access point will determine that authentication on the network side is passed.

The access point returns a network-layer authentication response message including the access points group identifier to the local service center after authentication is passed, so that the local service center authenticates the access point according to the network-layer authentication response message.

Particularly, the access point determines an authentication response parameter according to the random number in the network-layer authentication parameter after authentication is passed, and the access point returns the network-layer authentication response message including the access points group identifier and the authentication response parameter to the local service center, so that the local service center authenticates the access point according to the access points group identifier and the authentication response parameter.

Stated otherwise, the access point determines the authentication response parameter (RES) according to RAND in the network-layer authentication parameter after authentication on the network side is passed, and returns the network-layer authentication response message including APG_ID and RES to the local service center.

The access points group identifier APG_ID can be added to the network-layer authentication response message as a separate parameter, or the access points group identifier APG_ID can be XORed with the authentication response parameter to be added in a hidden way to the network-layer authentication response message, and for example, APG_ID and RES can be XORed.

Correspondingly, if the access points group identifier APG_ID and the authentication response parameter are XORed and added in a hidden way to the network-layer authentication response message to be sent, then the local service center will parse the authentication response parameter for the access points group identifier APG_ID upon reception of the network-layer authentication response message.

2. The local service center authenticates the access point.

The local service center receives the network-layer authentication response message including the access points group identifier returned by the access point, and then authenticates the access point according to the network-layer authentication response message.

If the authentication response parameter in the network-layer authentication response message is the same as the expected response parameter in the network-layer authentication parameter, then the local service center will determine that authentication on the access point is passed.

Particularly, the local service center determines whether RES in the network-layer authentication response message is the same as XRES in the network-layer authentication parameter, and if so, then it will determine that authentication on the access point is passed.

Figure 4:
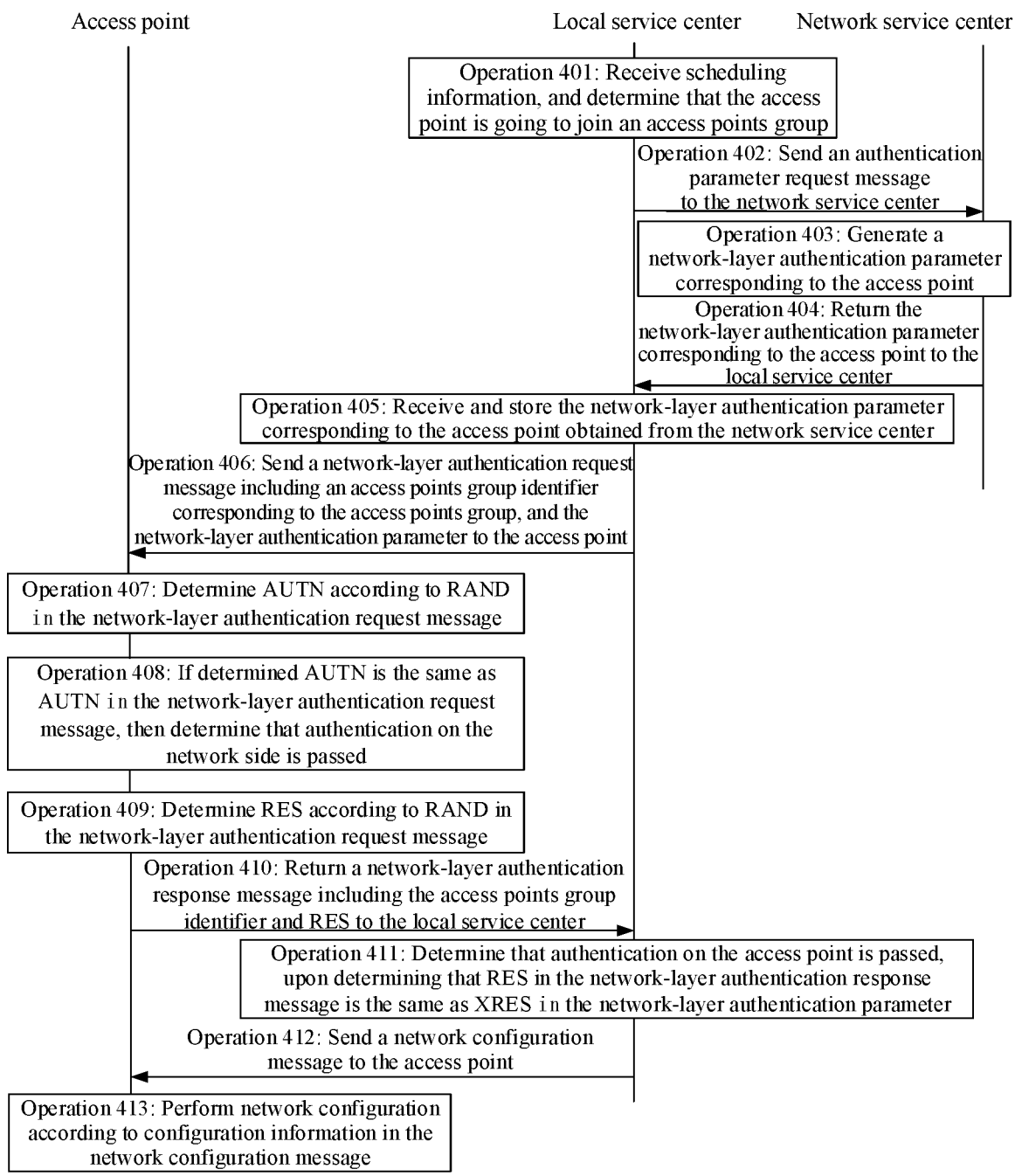
FIG. 4 is a second general flow chart of a method for joining an access points group according to an embodiment of the invention.

FIG. 4 illustrates a flow chart of a method for joining an access points group by an access point according to an embodiment of the invention, where the method includes the following operations.

In the operation 401, a local service center receives scheduling information, and determines that an access point is going to join an access points group.

In the operation 402, the local service center sends an authentication parameter request message to a network service center.

Where the authentication parameter request message includes identification information of a user equipment corresponding to the access points group.

In the operation 403, the network service center generates a network-layer authentication parameter corresponding to the access point.

In the operation 404, the local service center returns the network-layer authentication parameter corresponding to the access point to the local service center.

In the operation 405, the local service center receives and stores the network-layer authentication parameter corresponding to the access point obtained from the network service center.

In the operation 406, the local service center sends a network-layer authentication request message including an access points group identifier corresponding to the access points group, and the network-layer authentication parameter to the access point.

In the operation 407, the access point determines AUTN according to RAND in the network-layer authentication request message.

In the operation 408, if determined AUTN is the same as AUTN in the network-layer authentication request message, then the access point will determine that authentication on the network side is passed.

In the operation 409, the access point determines RES according to RAND in the network-layer authentication request message.

In the operation 410, the access point returns a network-layer authentication response message including the access points group identifier and RES to the local service center.

In the operation 411, the local service center determines that authentication on the access point is passed, upon determining that RES in the network-layer authentication response message is the same as XRES in the network-layer authentication parameter.

In the operation 412, the local service center sends a network configuration message to the access point.

In the operation 413, the access point performs network configuration according to configuration information in the network configuration message.

It shall be noted that, in the embodiment of the invention, the local service center includes a list of indexes for an access points group corresponding to each user equipment, where the list of indexes includes all the members in the access points group. The local service center adds the access point to the list of indexes corresponding to the access points group upon determining that the access point is going to join the access points group.

II. An access point quits an access points group.

The access point reports to the local service center that it quits the access points group upon determining that the access point is going to quit the access points group.

Here the access point determines that the access point is going to quit an access points group corresponding to a user equipment, as follows.

The access point determines that the access point is going to quit the access points group, when no target user equipment is detected in a coverage area, where the target user equipment is a user equipment which previously could be detected in the coverage area of the access point; and/or the access point determines that the access point is going to quit the access points group, when the access point is going to be powered off.

Here the access point sends an access points group quit message to the local service center, where the access points group quit message includes an access points group identifier of the access points group to be quitted by the access point.

Optionally, in the embodiment of the invention, the local service center sends a state inquiry message to the access point upon reception of the access points group quit message reported by the access point; and if the local service center has not received any feedback of the access point in a set length of time, then it will determine that the access point has quitted the access points group corresponding to the access points group identifier.

It shall be noted that, the local service center deletes the access point from the list of indexes corresponding to the access points group upon determining that the access point has quitted the access points group.

In the embodiment of the invention, a key can be further negotiated about after the access point joins the access points group.

Particularly, the network-layer authentication parameter obtained by the local service center from the network service center further includes a temporary key $K_{LSC}$.

Here $K_{LSC}$ is determined according to a root key k corresponding to the user equipment stored in the network service center, and RAND in the network-layer authentication parameter.

Since the root key corresponding to the user equipment is only stored at the user equipment side and in the network service center, in order to secure the root key, the network service center will not send the root key directly to the local service center.

Optionally, the local service center determines a first key and a second key corresponding to the access point according to the temporary key, and sends the first key and the second key to the access point, so that the access point determines a communication key for encrypted communication with the user equipment according to the first key, and determines a communication key for encrypted communication with another access point in the access points group according to the second key.

Particularly, the local service center determines an intermediate key corresponding to the access points group according to the temporary key and the access points group identifier, and the local service center determines the first key and the second key corresponding to the access point according to the intermediate key and the access points group identifier.

Correspondingly, the access point receives the first key and the second key sent by the local service center; and the access point determines the communication key for encrypted communication with the user equipment according to the first key, and determines the communication key for encrypted communication with another access point in the access points group according to the second key.

In order to secure the keys, the local service center deletes the temporary key, the intermediate key, the first key and the second key, corresponding to the access point, after the access point has quitted the access points group.

Figure 5:
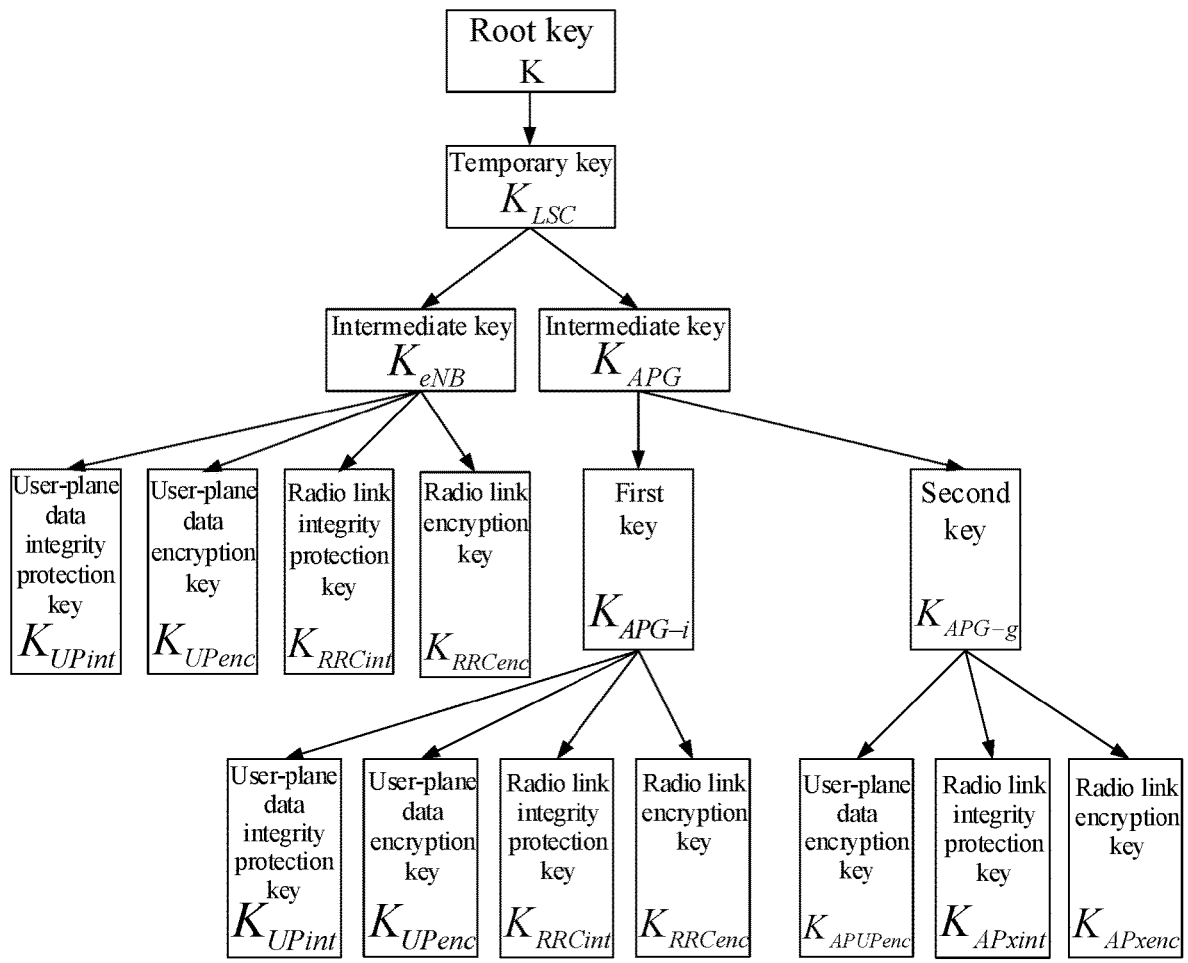
FIG. 5 is a flow chart of deriving a key according to an embodiment of the invention.

A procedure of deriving the keys will be described below in details with reference to FIG. 5.

1. The network service center determines the temporary key $K_{LSC}$ according to the root key, and sends the temporary key $K_{LSC}$ to the local service center.

2. The local service center can derive $K_{eNB}$ corresponding to an evolved Node B (eNB) or a Home evolved Node B (HeNB) according to the temporary key $K_{LSC}$, and derive the intermediate key ($K_{APG}$) corresponding to the access points group according to the temporary key $K_{LSC}$ and the access points group identifier.

3. The local service center sends $K_{eNB}$ to the corresponding eNB or HeNB, and the eNB or HeNB derives communication keys for encrypted communication with the user equipment according to $K_{eNB}$.

Where the communication keys for encrypted communication with the user equipment derived by the eNB or HeNB according to $K_{eNB}$ include: a user-plane data integrity protection key ($K_{UPint}$), a user-plane data encryption key ($K_{UPenc}$), a radio link integrity protection key ($K_{RRCint}$), and a radio link encryption key ($K_{RRCenc}$).

4. The local service center determines the first key $K_{APG-i}$ and the second key $K_{APG-g}$ corresponding to the access point according to the intermediate key $K_{APG}$ and the access points group identifier APG_ID.

5. The local service center sends the first key $K_{APG-i}$ and the second key $K_{APG-g}$ to the access point, and the access point derives communication keys for encrypted communication with the user equipment according to the first key $K_{APG-i}$, and derives communication keys for encrypted communication with another access point in the access points group according to the second key $K_{APG-g}$.

Where the communication keys for encrypted communication with the user equipment, derived by the access point according to the first key $K_{APG-i}$ include: the user-plane data integrity protection key ($K_{UPint}$), the user-plane data encryption key ($K_{UPenc}$), the radio link integrity protection key ($K_{RRCint}$), and the radio link encryption key ($K_{RRCenc}$); and the communication keys for encrypted communication with another access point in the access points group, derived by the access point according to the second key $K_{APG-g}$ include: a user-plane data encryption key ($K_{APUPenc}$), a radio link integrity protection key ($K_{APxint}$), and a radio link encryption key ($K_{APxenc}$).

It shall be noted that, the procedure of deriving the keys in the embodiment of the invention is compatible with a procedure of deriving keys in the existing 4G network architecture, and thus more applicable.

Figure 6:
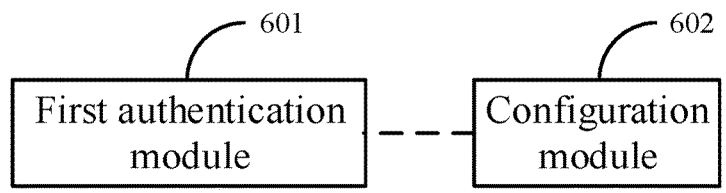
FIG. 6 is a schematic structural diagram of a first access point according to an embodiment of the invention.

As illustrated in FIG. 6, an access point according to an embodiment of the invention includes: a first authentication module 601 configured to perform network-layer mutual authentication with a local service center upon determining that the access point is going to join an access points group; and a configuration module 602 configured to perform network configuration, upon reception of a network configuration message sent by the local service center, according to configuration information in the network configuration message, where the network configuration message is sent by the local service center upon determining that network-layer mutual authentication is passed.

Optionally, the first authentication module 601 is configured to: authenticate a network side according to an access points group identifier corresponding to the access points group, and a network-layer authentication parameter, which are sent by the local service center; and return a network-layer authentication response message including the access points group identifier to the local service center after authentication on the network side is passed, so that the local service center authenticates the access point according to the network-layer authentication response message.

Optionally, the first authentication module 601 is configured to: determine a second authentication token according to a random number in the network-layer authentication parameter, and if the second authentication token is the same as a first authentication token in the network-layer authentication parameter, determine that authentication on the network side is passed.

Optionally, the first authentication module 601 is configured to: after authentication on the network side is passed, determine an authentication response parameter according to a random number in the network-layer authentication parameter, and return the network-layer authentication response message including the access points group identifier and the authentication response parameter to the local service center, so that the local service center authenticates the access point according to the access points group identifier and the authentication response parameter.

Optionally, the first authentication module 601 is configured to: determine that the access point is going to join the access points group, upon satisfying a joining condition; where the joining condition includes a part or all of: a new user equipment in a coverage area is detected; or an access instruction message sent by the local service center is received.

Optionally, the joining condition includes a new user equipment in a coverage area is detected; and the first authentication module 601 is further configured to: after it is determined that the access point is going to join the access points group, and before network-layer mutual authentication is performed with the local service center, send a joining request message to the local service center so that the local service center obtains a network-layer authentication parameter corresponding to the access point from a network service center according to the joining request message; and receive a network-layer authentication request message including an access points group identifier corresponding to the access points group, and the network-layer authentication parameter.

Optionally, the access instruction message includes an access points group identifier corresponding to the access points group, and a network-layer authentication parameter, where the network-layer authentication parameter is obtained by the local service center from a network service center.

Optionally, the first authentication module 601 is further configured to: report to the local service center that the access point has quitted the access points group upon determining that the access point is going to quit the access points group.

The first authentication module 601 is configured to: determine that the access point is going to quit the access points group, when no target user equipment is detected in a coverage area, where the target user equipment is a user equipment which previously could be detected in the coverage area of the access point; and/or determine that the access point is going to quit the access points group, when the access point is going to be powered off.

Optionally, the first authentication module 601 is further configured to: after network-layer mutual authentication is performed with the local service center, receive a first key and a second key sent by the local service center; determine a communication key for encrypted communication with the user equipment according to the first key, and determine a communication key for encrypted communication with another access point in the access points group according to the second key.

Figure 7:
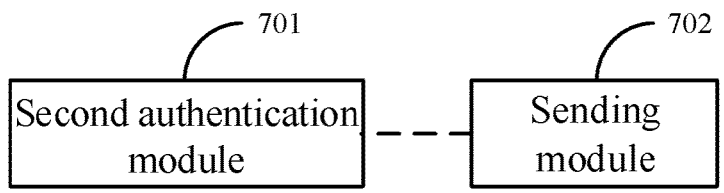
FIG. 7 is a schematic structural diagram of a first local service center according to an embodiment of the invention.

As illustrated in FIG. 7, a local service center according to an embodiment of the invention includes: a second authentication module 701 configured to perform network-layer mutual authentication with an access point upon determining that the access point is going to join an access points group; and a sending module 702 configured to send a network configuration message to the access point upon determining that network-layer mutual authentication is passed, so that the access point is configured according to configuration information in the network configuration message.

Optionally, the second authentication module 701 is configured to: perform network-layer mutual authentication with the access point according to an access points group identifier corresponding to the access points group, and a network-layer authentication parameter, where the network-layer authentication parameter is obtained by the local service center from a network service center.

Optionally, the second authentication module 701 is configured to: send the access points group identifier corresponding to the access points group, and the network-layer authentication parameter to the access point, so that the access point authenticates the network side according to the access points group identifier and the network-layer authentication parameter; and if a network-layer authentication response message including the access points group identifier, returned by the access point is received, authenticate the access point according to the network-layer authentication response message.

Optionally, the second authentication module 701 is configured to: if an authentication response parameter in the network-layer authentication response message is the same as an expected response parameter in the network-layer authentication parameter, determine that authentication on the access point is passed.

Optionally, the second authentication module 701 is configured to: determine that the access point is going to join the access points group, upon reception of a joining request message sent by the access point; and/or determine that the access point is going to join the access points group, according to scheduling information.

Optionally, the second authentication module 701 is configured to: if it is determined that the access point is going to join the access points group, upon reception of the joining request message sent by the access point, send a network-layer authentication request message including the access points group identifier corresponding to the access points group, and the network-layer authentication parameter to the access point so that the access point authenticates the network side according to the network-layer authentication request message; and if it is determined that the access point is going to join the access points group, according to the scheduling information, send an access instruction message including the access points group identifier corresponding to the access points group, and the network-layer authentication parameter to the access point so that the access point authenticates the network side according to the access instruction message.

Optionally, the network-layer authentication parameter includes a temporary key; and the second authentication module 701 is further configured to: after it is determined that network-layer mutual authentication is passed, determine a first key and a second key corresponding to the access point according to the temporary key, and send the first key and the second key to the access point, so that the access point determines a communication key for encrypted communication with a user equipment according to the first key, and determines a communication key for encrypted communication with another access point in the access points group according to the second key.

Optionally, the second authentication module 701 is further configured to: determine an intermediate key corresponding to the access points group according to the temporary key and the access points group identifier, and determine the first key and the second key corresponding to the access point according to the intermediate key and the access points group identifier.

Optionally, the sending module 702 is further configured to: after the network configuration message is sent to the access point, upon reception of a report of the access point that the access point has quitted an access points group corresponding to a user equipment, determine that the access point has quitted the access points group corresponding to the user equipment, and delete the temporary key, the intermediate key, the first key, and the second key.

Figure 8:
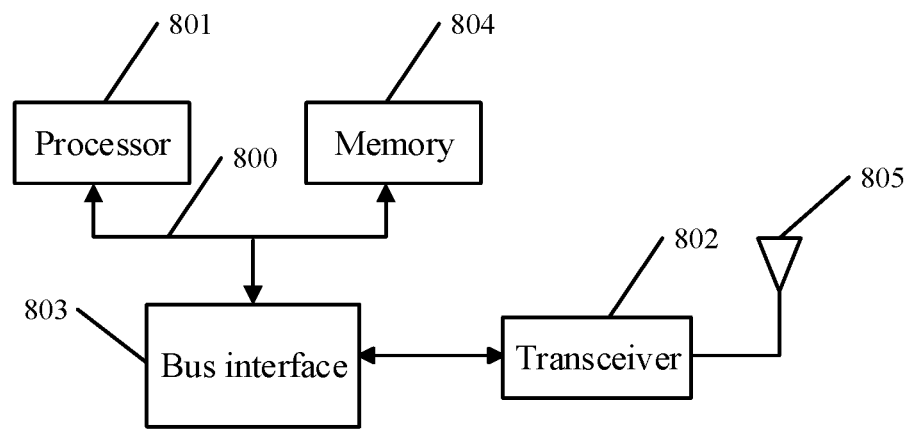
FIG. 8 is a schematic structural diagram of a second access point according to an embodiment of the invention.

As illustrated in FIG. 8, a second access point according to an embodiment of this disclosure includes a processor 801 configured to read and execute programs in a memory 804 to: perform network-layer mutual authentication with a local service center upon determining that the access point is going to join an access points group; and upon reception of a network configuration message sent by the local service center, through a transceiver 802, perform network configuration according to configuration information in the network configuration message, where the network configuration message is sent by the local service center upon determining that network-layer mutual authentication is passed; and the transceiver 802 configured to transmit and receive data under the control of the processor 801.

Optionally, the processor 801 is configured to: authenticate a network side according to an access points group identifier corresponding to the access points group, and a network-layer authentication parameter, which are sent by the local service center, and return a network-layer authentication response message including the access points group identifier to the local service center through the transceiver 802 after authentication on the network side is passed, so that the local service center authenticates the access point according to the network-layer authentication response message.

Optionally, the processor 801 is configured to: determine a second authentication token according to a random number in the network-layer authentication parameter, and if the second authentication token is the same as a first authentication token in the network-layer authentication parameter, determine that authentication on the network side is passed.

Optionally, the processor 801 is configured to: after authentication on the network side is passed, determine an authentication response parameter according to a random number in the network-layer authentication parameter, and return a network-layer authentication response message including the access points group identifier and the authentication response parameter to the local service center through the transceiver 802, so that the local service center authenticates the access point according to the access points group identifier and the authentication response parameter.

Optionally, the processor 801 is configured to: determine that the access point is going to join the access points group, upon satisfying a joining condition; where the joining condition includes a part or all of: a new user equipment in a coverage area is detected; or an access instruction message sent by the local service center is received through the transceiver 802.

Optionally, the joining condition includes a new user equipment in a coverage area is detected; and the processor 801 is further configured to: after it is determined that the access point is going to join the access points group, and before network-layer mutual authentication is performed with the local service center, send a joining request message to the local service center through the transceiver 802 so that the local service center obtains network-layer authentication parameter corresponding to the access point from a network service center according to the joining request message; and receive a network-layer authentication request message including an access points group identifier corresponding to the access points group, and the network-layer authentication parameter through the transceiver 802.

Optionally, the access instruction message includes an access points group identifier corresponding to the access points group, and network-layer authentication parameter, where the network-layer authentication parameter is obtained by the local service center from a network service center.

Optionally, the processor 801 is further configured to: report to the local service center a quit from an access points group through the transceiver 802 upon determining that the access point is going to quit the access points group; and the processor 801 is configured to: determine that the access point is going to quit the access points group, when no target user equipment is detected in a coverage area, where the target user equipment is a user equipment which previously could be detected in the coverage area of the access point; and/or determine that the access point is going to quit the access points group, when the access point is going to be powered off.

Optionally, the processor 801 is further configured to: after network-layer mutual authentication is performed with the local service center, receive a first key and a second key sent by the local service center, through the transceiver 802; determine a communication key for encrypted communication with the user equipment according to the first key, and determine a communication key for encrypted communication with another access point in the access points group.

In an implementation, the processor 801 interacts with both the local service center and the user equipment through the transceiver 802, and a repeated description thereof will be omitted here.

In an implementation, the processor 801 interacts with the user equipment through the transceiver 802, and the processor 801 can also interact with the local service center through the transceiver 802. There are at least two transmission modes of the transceiver 802, where it interacts with the user equipment in one of the transmission modes, e.g., a wireless transmission mode, and with the local service center in the other transmission mode, e.g., a wireless transmission mode, or a wired transmission mode, etc.

Here the local service center can be connected with the access point in a wired, wireless, or another way; and the access point can be connected wirelessly with the user equipment.

In FIG. 8, in the bus architecture (represented as the bus 800) can include any number of interconnecting buses and bridges to link together various circuits including one or more processors represented by the processor 801, and one or more memories represented by the memory 804. The bus 800 can further link together various other circuits, e.g., a peripheral device, a manostat, a power management circuit, etc., all of which are well known in the art, so a further description thereof will be omitted in this context. The bus interface 803 serves as an interface between the bus 800 and the transceiver 802. The transceiver 802 can be one element, or can be a number of elements, e.g., a number of transmitters and receivers, which are units for communication with various other devices over a transmission medium. Data processed by the processor 801 are transmitted over a radio medium through the antenna 805, and furthermore the antenna 805 further receives and transports data to the processor 801.

The processor 801 is responsible for managing the bus 800 and performing normal processes, and can further provide various functions of timing, a peripheral interface, voltage regulation, power supply management, and other control functions, and the memory 804 can be configured to store data for use by the processor 801 in performing the operations.

Optionally, the processor 801 can be a CPU, an ASIC, an FPGA, or a CPLD.

Figure 9:
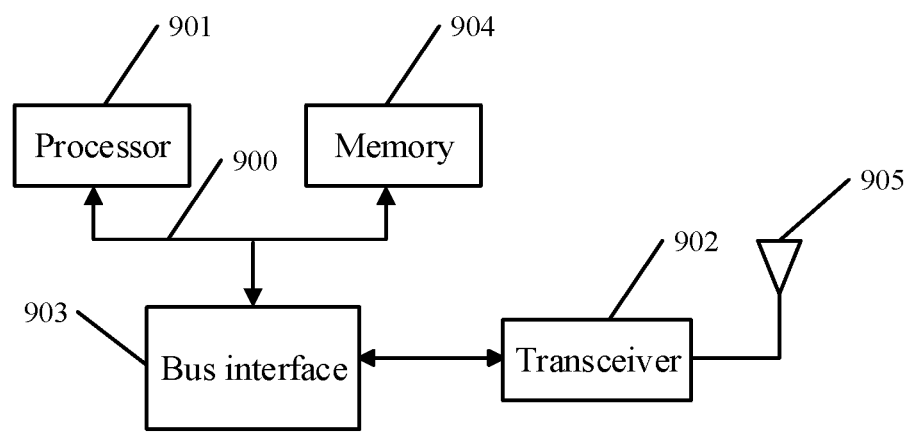
FIG. 9 is a schematic structural diagram of a second local service center according to an embodiment of the invention.

As illustrated in FIG. 9, a second local service center according to an embodiment of the invention includes a processor 901 configured to read and execute programs in a memory 904 to: perform network-layer mutual authentication with an access point upon determining that the access point is going to join an access points group; and send a network configuration message to the access point through a transceiver 902 upon determining that network-layer mutual authentication is passed, so that the access point is configured according to configuration information in the network configuration message; and the transceiver 902 configured to transmit and receive data under the control of the processor 901.

Optionally, the processor 901 is configured to: perform network-layer mutual authentication with the access point according to an access points group identifier corresponding to the access points group, and a network-layer authentication parameter, where the network-layer authentication parameter is obtained by the local service center from a network service center.

Optionally the processor 901 is configured to: send the access points group identifier corresponding to the access points group, and the network-layer authentication parameter to the access point through the transceiver 902 so that the access point authenticates the network side according to the access points group identifier and the network-layer authentication parameter; and if a network-layer authentication response message including the access points group identifier, returned by the access point is received through the transceiver 902, authenticate the access point according to the network-layer authentication response message.

Optionally, the processor 901 is configured to: if an authentication response parameter in the network-layer authentication response message is the same as an expected response parameter in the network-layer authentication parameter, determine that authentication on the access point is passed.

Optionally, the processor 901 is configured to: determine that the access point is going to join the access points group, upon reception of a joining request message sent by the access point through the transceiver 902; and/or determine that the access point is going to join the access points group, according to scheduling information.

Optionally, the processor 901 is configured to: if it is determined that the access point is going to join the access points group, upon reception of the joining request message sent by the access point through the transceiver 902, send a network-layer authentication request message including the access points group identifier corresponding to the access points group, and the network-layer authentication parameter to the access point so that the access point authenticates the network side according to the network-layer authentication request message; and if it is determined that the access point is going to join the access points group, according to the scheduling information, send an access instruction message including the access points group identifier corresponding to the access points group, and the network-layer authentication parameter to the access point through the transceiver 902 so that the access point authenticates the network side according to the access instruction message.

Optionally, the network-layer authentication parameter includes a temporary key; and the processor 901 is further configured to: after it is determined that network-layer mutual authentication is passed, determine a first key and a second key corresponding to the access point according to the temporary key, and send the first key and the second key to the access point, so that the access point determines a communication key for encrypted communication with a user equipment according to the first key, and determines a communication key for encrypted communication with another access point in the access points group according to the second key.

Optionally, the processor 901 is further configured to: determine an intermediate key corresponding to the access points group according to the temporary key and the access points group identifier, and determine the first key and the second key corresponding to the access point according to the intermediate key and the access points group identifier.

Optionally, the processor 901 is further configured to: after the network configuration message is sent to the access point through the transceiver 902, upon reception of a report of the access point that the access point has quitted an access points group corresponding to a user equipment, determine that the access point has quitted the access points group corresponding to the user equipment, and delete the temporary key, the intermediate key, the first key, and the second key.

In an implementation, the processor 901 interacts with the user equipment through the transceiver 902 and the access point, that is, the processor 901 sends information, to be sent to the user equipment, to the access point through the transceiver 902, and the access point sends the information to the user equipment; and upon reception of information, from the user equipment, to be sent to the local service center, the access point sends the information to the local service center, and the processor 901 receives the information through the transceiver 902.

Here the local service center can be connected with the access point in a wired, wireless, or another way.

In FIG. 9, in the bus architecture (represented as the bus 900) can include any number of interconnecting buses and bridges to link together various circuits including one or more processors represented by the processor 901, and one or more memories represented by the memory 904. The bus 900 can further link together various other circuits, e.g., a peripheral device, a manostat, a power management circuit, etc., all of which are well known in the art, so a further description thereof will be omitted in this context. The bus interface 903 serves as an interface between the bus 900 and the transceiver 902. The transceiver 902 can be one element, or can be a number of elements, e.g., a number of transmitters and receivers, which are units for communication with various other devices over a transmission medium. Data processed by the processor 901 are transmitted over a radio medium through the antenna 905, and furthermore the antenna 905 further receives and transports data to the processor 901.

The processor 901 is responsible for managing the bus 900 and performing normal processes, and can further provide various functions of timing, a peripheral interface, voltage regulation, power supply management, and other control functions, and the memory 904 can be configured to store data for use by the processor 901 in performing the operations.

Optionally, the processor 901 can be a CPU, an ASIC, an FPGA, or a CPLD.

Based upon the same inventive idea, an embodiment of the invention further provides a method for joining an access points group, and since a device corresponding to the method is the access point in the system for joining an access points group according to the embodiment of the invention, and the method addresses the problem under a similar principle to the device, reference can be made to the implementation of the device for an implementation of the method, and a repeated description thereof will be omitted here.

Figure 10:
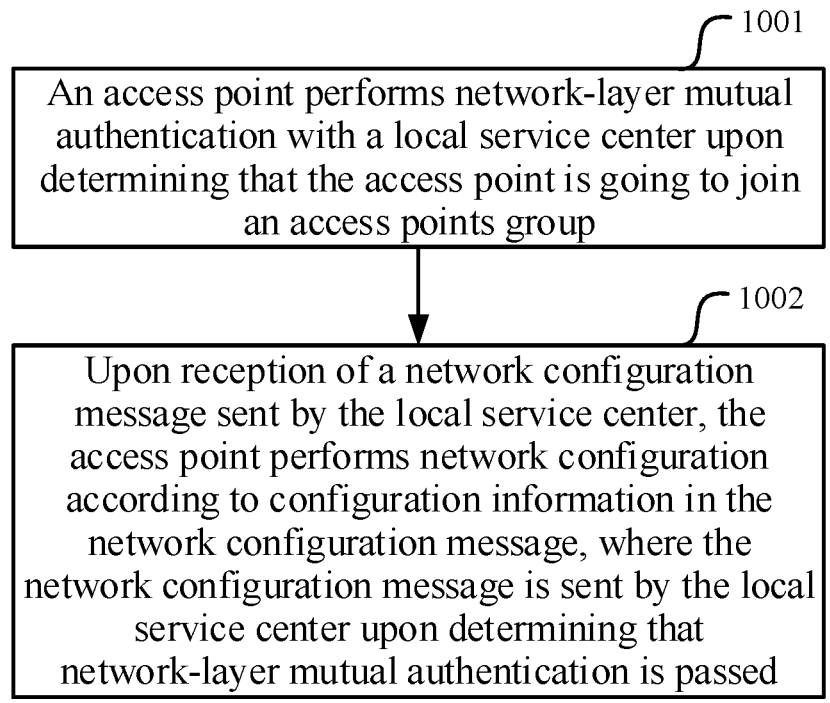
FIG. 10 is a flow chart of a method for joining an access points group at an access point side according to an embodiment of the invention.

As illustrated in FIG. 10, a method for joining an access points group according to an embodiment of the invention includes the following operations.

In the operation 1001, an access point performs network-layer mutual authentication with a local service center upon determining that the access point is going to join an access points group.

In the operation 1002, upon reception of a network configuration message sent by the local service center, the access point performs network configuration according to configuration information in the network configuration message, where the network configuration message is sent by the local service center upon determining that network-layer mutual authentication is passed.

Optionally, the access point performs network-layer mutual authentication with the local service center as follows.

The access point authenticates the network side according to an access points group identifier corresponding to the access points group, and a network-layer authentication parameter, which are sent by the local service center; and the access point returns a network-layer authentication response message including the access points group identifier to the local service center after authentication on the network side is passed, so that the local service center authenticates the access point according to the network-layer authentication response message.

Optionally, the access point authenticates the network side according to the access points group identifier corresponding to the access points group, and the network-layer authentication parameter, which are sent by the local service center as follows.

The access point determines a second authentication token according to a random number in the network-layer authentication parameter; and if the second authentication token is the same as a first authentication token in the network-layer authentication parameter, then the access point will determine that authentication on the network side is passed.

Optionally, the access point returns the network-layer authentication response message including the access points group identifier to the local service center after authentication is passed, as follows.

After authentication on the network side is passed, the access point determines an authentication response parameter according to a random number in the network-layer authentication parameter; and the access point returns the network-layer authentication response message including the access points group identifier and the authentication response parameter to the local service center, so that the local service center authenticates the access point according to the access points group identifier and the authentication response parameter.

Optionally, the access point determines that the access point is going to join the access points group, as follows.

The access point determines that the access point is going to join the access points group, upon satisfying a joining condition; where the joining condition includes a part or all of: a new user equipment in a coverage area is detected; or an access instruction message sent by the local service center is received.

Optionally, the joining condition includes a new user equipment in a coverage area is detected; and after the access point determines that the access point is going to join the access points group, and before the access point performs network-layer mutual authentication with the local service center, the method further includes: the access point sends a joining request message to the local service center so that the local service center obtains a network-layer authentication parameter corresponding to the access point from a network service center according to the joining request message; and the access point receives a network-layer authentication request message including an access points group identifier corresponding to the access points group, and the network-layer authentication parameter.

Optionally, the access instruction message includes an access points group identifier corresponding to the access points group, and a network-layer authentication parameter, where the network-layer authentication parameter is obtained by the local service center from a network service center.

Optionally, the method further includes: the access point reports to the local service center a quit from an access points group upon determining that the access point is going to quit the access points group.

And the access point determines that the access point is going to quit an access points group corresponding to a user equipment, as follows.

The access point determines that the access point is going to quit the access points group, when no target user equipment is detected in a coverage area, where the target user equipment is a user equipment which previously could be detected in the coverage area of the access point; and/or the access point determines that the access point is going to quit the access points group, when the access point is going to be powered off.

Optionally, after the access point performs network-layer mutual authentication with the local service center, the method further includes: the access point receives a first key and a second key sent by the local service center; and the access point determines a communication key for encrypted communication with the user equipment according to the first key, and determines a communication key for encrypted communication with another access point in the access points group.

Based upon the same inventive idea, an embodiment of the invention further provides a method for joining an access points group, and since a device corresponding to the method is a local service center in the system for joining an access points group, and the method addresses the problem under a similar principle to the device, reference can be made to the implementation of the device for an implementation of the method, and a repeated description thereof will be omitted here.

Figure 11:
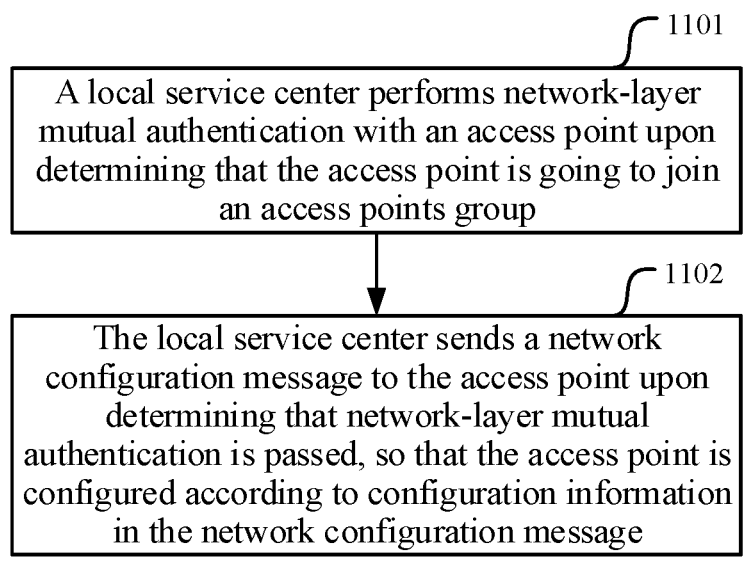
FIG. 11 is a flow chart of a method for assisting by a local service center an access point in joining an access points group according to an embodiment of the invention.

As illustrated in FIG. 11, a method for joining an access points group according to an embodiment of the invention includes the following operations.

In the operation 1101, a local service center performs network-layer mutual authentication with an access point upon determining that the access point is going to join an access points group.

In the operation 1102, the local service center sends a network configuration message to the access point upon determining that network-layer mutual authentication is passed, so that the access point is configured according to configuration information in the network configuration message.

Optionally, the local service center performs network-layer mutual authentication with the access point includes: the local service center performs network-layer mutual authentication with the access point according to an access points group identifier corresponding to the access points group, and a network-layer authentication parameter; where the network-layer authentication parameter is obtained by the local service center from a network service center.

Optionally, the local service center performs network-layer mutual authentication with the access point according to the access points group identifier corresponding to the access points group, and the network-layer authentication parameter as follows: the local service center sends the access points group identifier corresponding to the access points group, and the network-layer authentication parameter to the access point so that the access point authenticates the network side according to the access points group identifier and the network-layer authentication parameter; and if the local service center receives a network-layer authentication response message including the access points group identifier, returned by the access point, then the local service center will authenticate the access point according to the network-layer authentication response message.

Optionally, the local service center authenticates the access point according to the network-layer authentication response message as follows: if an authentication response parameter in the network-layer authentication response message is the same as an expected response parameter in the network-layer authentication parameter, then the local service center will determine that authentication on the access point is passed.

Optionally, the local service center determines that the access point is going to join the access points group, as follows: the local service center determines that the access point is going to join the access points group, upon reception of a joining request message sent by the access point; and/or the local service center determines that the access point is going to join the access points group, according to scheduling information.

Optionally, if the local service center determines that the access point is going to join the access points group, upon reception of the joining request message sent by the access point, then the local service center will send a network-layer authentication request message including the access points group identifier corresponding to the access points group, and the network-layer authentication parameter to the access point so that the access point authenticates the network side according to the network-layer authentication request message; and if the local service center determines that the access point is going to join the access points group, according to the scheduling information, then the local service center will send an access instruction message including the access points group identifier corresponding to the access points group, and the network-layer authentication parameter to the access point so that the access point authenticates the network side according to the access instruction message.

Optionally, the network-layer authentication parameter includes a temporary key; and after the local service center determines that network-layer mutual authentication is passed, the method further includes: the local service center determines a first key and a second key corresponding to the access point according to the temporary key, and send the first key and the second key to the access point, so that the access point determines a communication key for encrypted communication with a user equipment according to the first key, and determines a communication key for encrypted communication with another access point in the access points group according to the second key.

Optionally, the local service center determines the first key and the second key corresponding to the access point, relative to another access point in the access points group, according to the temporary key as follows.

The local service center determines an intermediate key corresponding to the access points group according to the temporary key and the access points group identifier; and the local service center determines the first key and the second key corresponding to the access point according to the intermediate key and the access points group identifier.

Optionally, after the local service center sends the network configuration message to the access point, the method further includes: upon reception of a report of the access point that the access point has quitted an access points group corresponding to a user equipment, the local service center determines that the access point has quitted the access points group corresponding to the user equipment, and deletes the temporary key, the intermediate key, the first key, and the second key.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for joining an access points group, the method comprising:
    performing, by an access point, network-layer mutual authentication with a local service center upon determining that the access point is going to join an access points group;
    receiving, by the access point, a network configuration message, wherein the network configuration message is sent by the local service center after determining that network-layer mutual authentication is passed; and
    performing, by the access point, network configuration according to configuration information in the network configuration message;
    wherein said performing, by the access point, network-layer mutual authentication with the local service center comprises:
    authenticating, by the access point, a network side according to an access points group identifier corresponding to the access points group, and a network-layer authentication parameter, which are sent by the local service center; and
    returning, by the access point, a network-layer authentication response message comprising the access points group identifier to the local service center after authentication on the network side is passed, wherein the local service center authenticates the access point according to the network-layer authentication response message.

2. The method according to claim 1, wherein authenticating, by the access point, the network side according to the access points group identifier corresponding to the access points group, and the network-layer authentication parameter, which are sent by the local service center comprises:
    determining, by the access point, a second authentication token according to a random number in the network-layer authentication parameter; and
    determining, by the access point, that authentication on the network side is passed if the second authentication token is same as a first authentication token in the network-layer authentication parameter.

3. The method according to claim 1, wherein returning, by the access point, the network-layer authentication response message comprising the access points group identifier to the local service center after authentication is passed comprises:
    determining, by the access point, an authentication response parameter according to a random number in the network-layer authentication parameter, after authentication on the network side is passed; and
    returning, by the access point, the network-layer authentication response message comprising the access points group identifier and the authentication response parameter to the local service center, so that the local service center authenticates the access point according to the access points group identifier and the authentication response parameter.

4. The method according to claim 1, wherein determining, by the access point, that the access point is going to join the access points group, comprises:
    determining, by the access point, that the access point is going to join the access points group, upon satisfying a joining condition;
    wherein the joining condition comprises a part or all of:
    a new user equipment in a coverage area is detected; or
    an access instruction message sent by the local service center is received.

5. The method according to claim 4, wherein the joining condition comprises that the new user equipment in the coverage area is detected; and
    after the access point determines that the access point is going to join the access points group, and before the access point performs network-layer mutual authentication with the local service center, the method further comprises:
    sending, by the access point, a joining request message to the local service center so that the local service center obtains a network-layer authentication parameter corresponding to the access point from a network service center according to the joining request message; and
    receiving, by the access point, a network-layer authentication request message comprising an access points group identifier corresponding to the access points group, and the network-layer authentication parameter.

6. The method according to claim 4, wherein the access instruction message comprises an access points group identifier corresponding to the access points group, and a network-layer authentication parameter, wherein the network-layer authentication parameter is obtained by the local service center from a network service center.

7. The method according to claim 1, wherein the method further comprises:
    reporting, by the access point, to the local service center a quit from the access points group upon determining that the access point is going to quit the access points group; and
    determining, by the access point, that the access point is going to quit an access points group corresponding to a user equipment comprises:
    determining, by the access point, that the access point is going to quit the access points group, when no target user equipment is detected in a coverage area, wherein the target user equipment is a user equipment which previously is able to be detected in the coverage area of the access point; and/or
    determining, by the access point, that the access point is going to quit the access points group, when the access point is going to be powered off.

8. The method according to claim 1, wherein after the access point performs network-layer mutual authentication with the local service center, the method further comprises:
    receiving, by the access point, a first key and a second key sent by the local service center; and determining, by the access point, a communication key for encrypted communication with the user equipment according to the first key, and determining a communication key for encrypted communication with another access point in the access points group according to the second key.

9. A method for joining an access points group, the method comprising:
performing, by a local service center, network-layer mutual authentication with an access point upon determining that the access point is going to join an access points group; and
sending, by the local service center, a network configuration message to the access point after determining that network-layer mutual authentication is passed, so that the access point is configured according to configuration information in the network configuration message;
wherein said performing, by the local service center, network-layer mutual authentication with the access point comprises:
performing, by the local service center, network-layer mutual authentication with the access point according to an access points group identifier corresponding to the access points group, and a network-layer authentication parameter;
wherein the network-layer authentication parameter is obtained by the local service center from a network service center.

10. The method according to claim 9, wherein performing, by the local service center, network-layer mutual authentication with the access point according to the access points group identifier corresponding to the access points group, and the network-layer authentication parameter comprises:
sending, by the local service center, the access points group identifier corresponding to the access points group, and the network-layer authentication parameter to the access point so that the access point authenticates a network side according to the access points group identifier and the network-layer authentication parameter; and
authenticating, by the local service center, the access point according to a network-layer authentication response message comprising the access points group identifier, returned by the access point, upon determining that the network-layer authentication response message is received by the local service center.

11. The method according to claim 10, wherein authenticating, by the local service center, the access point according to the network-layer authentication response message comprises:
determining, by the local service center, that authentication on the access point is passed, if an authentication response parameter in the network-layer authentication response message is same as an expected response parameter in the network-layer authentication parameter.

12. The method according to claim 9, wherein determining, by the local service center, that the access point is going to join the access points group comprises:
determining, by the local service center, that the access point is going to join the access points group, upon reception of a joining request message sent by the access point; and/or determining, by the local service center, that the access point is going to join the access points group, according to scheduling information.

13. The method according to claim 12, wherein if the local service center determines that the access point is going to join the access points group, upon reception of the joining request message sent by the access point, then the local service center sends a network-layer authentication request message comprising the access points group identifier corresponding to the access points group, and the network-layer authentication parameter to the access point so that the access point authenticates the network side according to the network-layer authentication request message; and
if the local service center determines that the access point is going to join the access points group, according to the scheduling information, then the local service center sends an access instruction message comprising the access points group identifier corresponding to the access points group, and the network-layer authentication parameter to the access point so that the access point authenticates the network side according to the access instruction message.

14. The method according to claim 9, wherein the network-layer authentication parameter comprises a temporary key; and
after the local service center determines that network-layer mutual authentication is passed, the method further comprises:
determining, by the local service center, a first key and a second key corresponding to the access point according to the temporary key, and sending the first key and the second key to the access point, so that the access point determines a communication key for encrypted communication with a user equipment according to the first key, and determines a communication key for encrypted communication with another access point in the access points group according to the second key.

15. The method according to claim 14, wherein determining, by the local service center, the first key and the second key corresponding to the access point, relative to another access point in the access points group, according to the temporary key comprises:
determining, by the local service center, an intermediate key corresponding to the access points group according to the temporary key and the access points group identifier; and
determining, by the local service center, the first key and the second key corresponding to the access point according to the intermediate key and the access points group identifier.

16. The method according to claim 15, wherein after the local service center sends the network configuration message to the access point, the method further comprises:
determining, by the local service center, that the access point has quitted an access points group corresponding to a user equipment, and deleting the temporary key, the intermediate key, the first key and the second key, upon reception of a report of the access point that the access point has quitted the access points group corresponding to the user equipment.

17. An access point, comprising at least one processor and a memory; wherein the memory is configured to store readable program codes, and the at least one processor is configured to execute the readable program codes to:
perform network-layer mutual authentication with a local service center upon determining that the access point is going to join an access points group;

receive a network configuration message, wherein the network configuration message is sent by the local service center after determining that network-layer mutual authentication is passed; and perform network configuration according to configuration information in the network configuration message;

wherein the at least one processor is further configured to execute the readable program codes to:

authenticate a network side according to an access points group identifier corresponding to the access points group, and a network-layer authentication parameter, which are sent by the local service center; and return a network-layer authentication response message comprising the access points group identifier to the local service center after authentication on the network side is passed, wherein the local service center authenticates the access point according to the network-layer authentication response message.

\* \* \* \* \*